J. H. VAN SCIVER.
AUTOMOBILE SIGNAL.
APPLICATION FILED MAR. 8, 1921.
1,385,596.
Patented July 26, 1921.
3 SHEETS—SHEET 1.
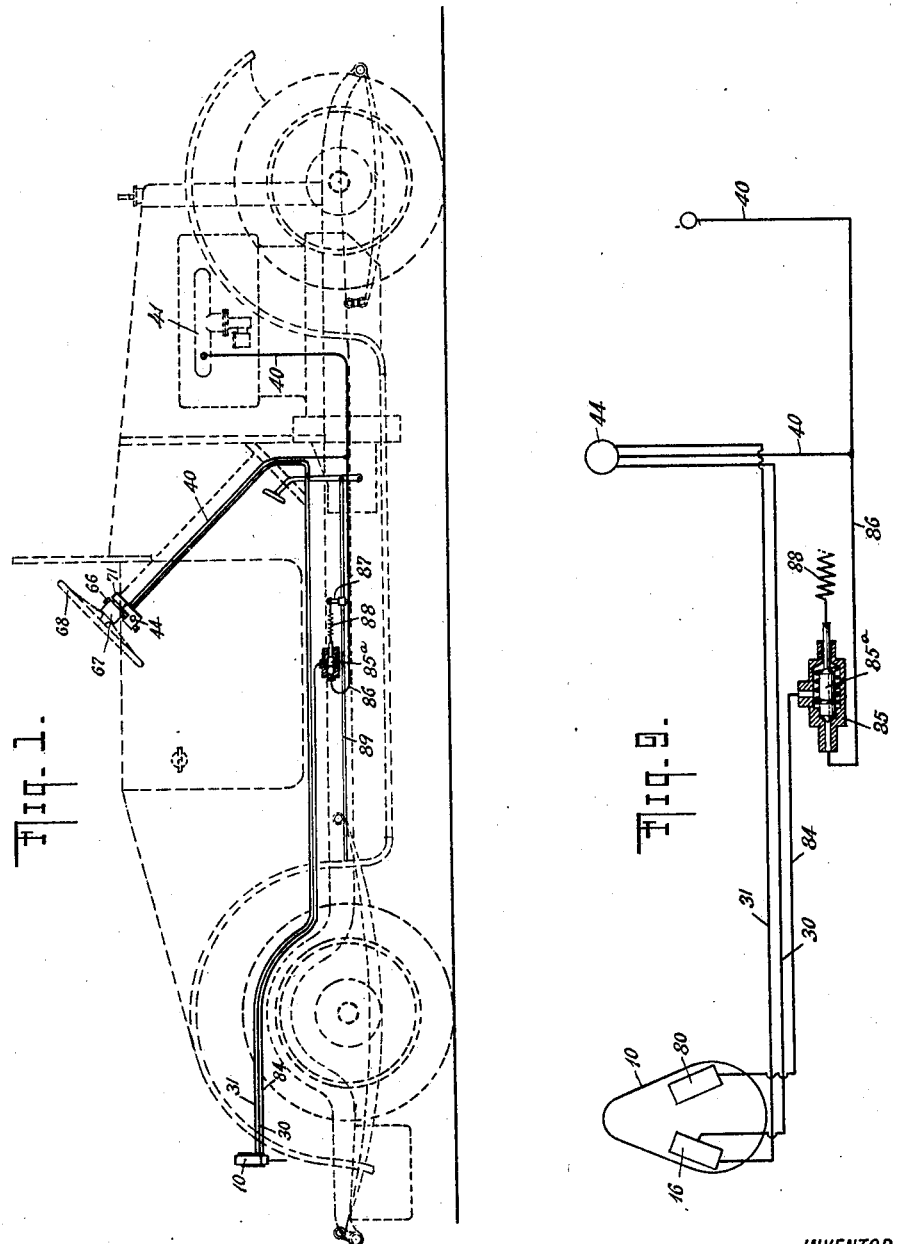
WITNESSES
INVENTOR
ATTORNEYS

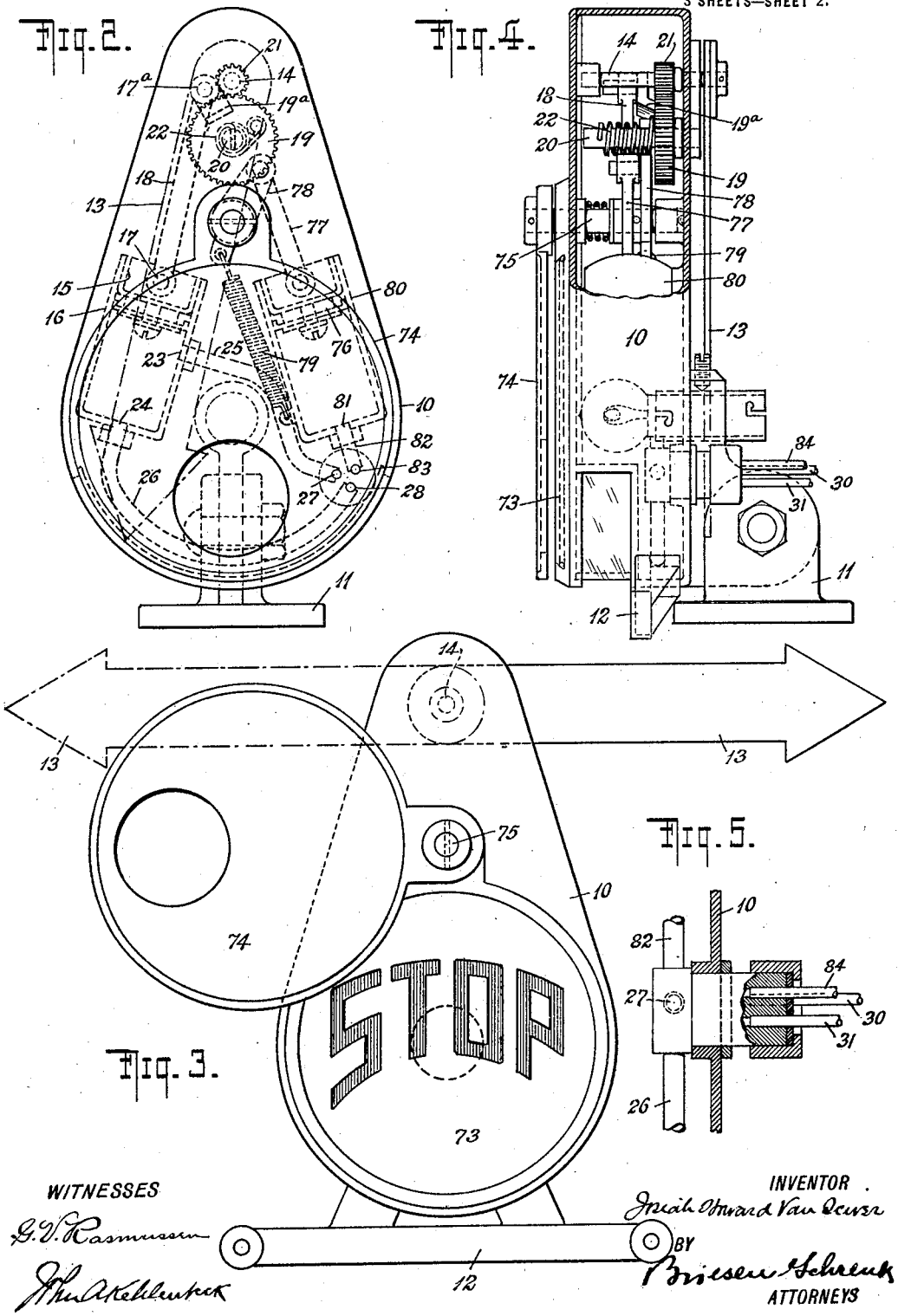

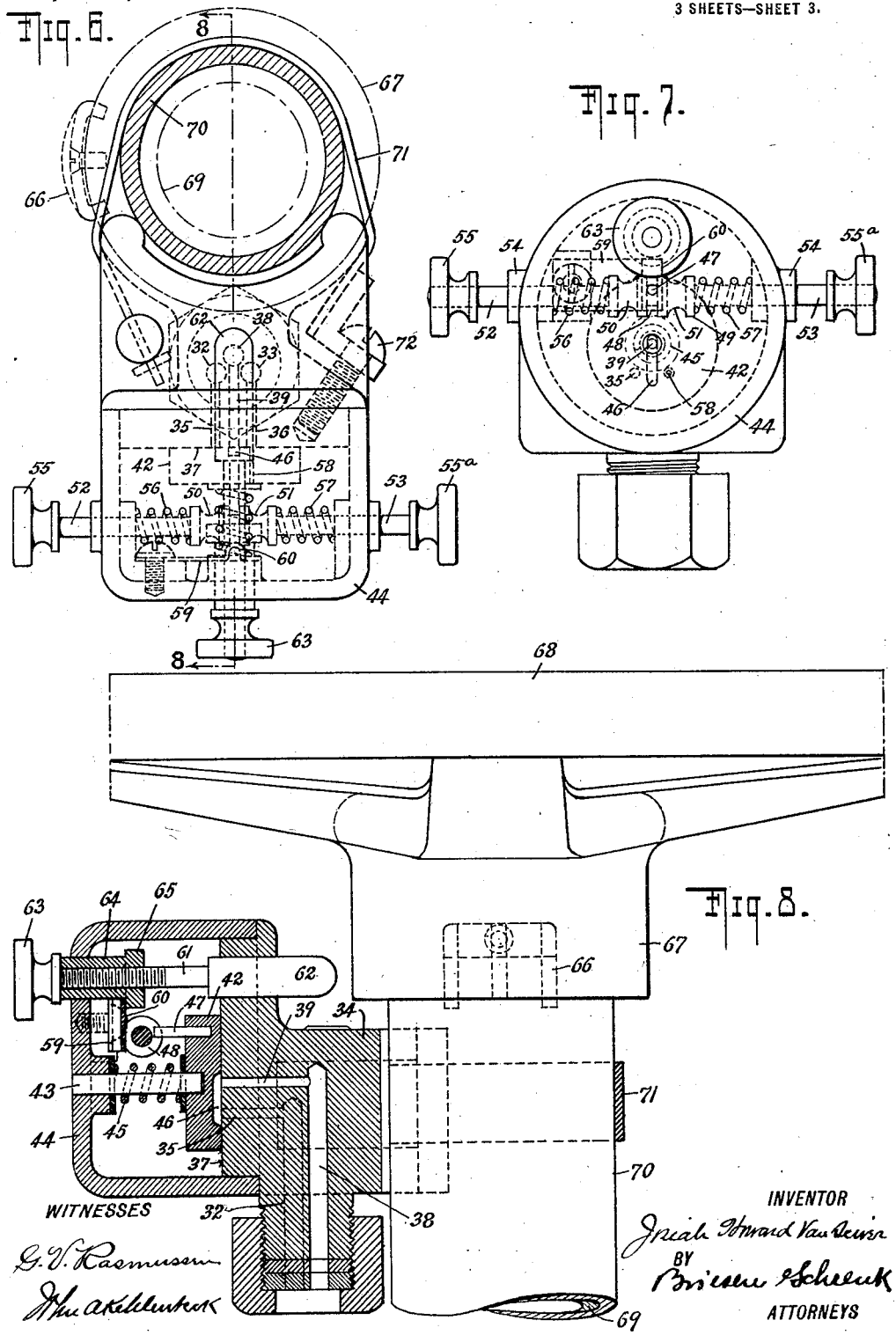

UNITED STATES PATENT OFFICE.

JOSIAH HOWARD VAN SCIVER, OF PHILADELPHIA, PENNSYLVANIA, ASSIGNOR TO AUTOMOBILE APPLIANCES CO., OF PHILADELPHIA, PENNSYLVANIA, A CORPORATION OF PENNSYLVNIA.

AUTOMOBILE-SIGNAL.

1,385,596.

Specification of Letters Patent.

Patented July 26, 1921.

Application filed March 8, 1921. Serial No. 450,691.

*To all whom it may concern:*

Be it known that I, JOSIAH HOWARD VAN SCIVER, a citizen of the United States, and resident of Philadelphia, county of Philadelphia, State of Pennsylvania, have invented certain new and useful Improvements in Automobile-Signals, of which the following is a specification.

My invention relates to signals and more particularly to that type thereof which are commonly designated as automobile signals. In the operation of automobiles and other self-propelled vehicles, it is necessary ofttimes, at frequent intervals, to change the direction of travel; that is, to leave the highway being traversed, either to the right or left. In such cases, it is usual for the driver of the vehicle to signal to vehicles behind him or coming toward him by raising and extending one arm outwardly from the vehicle. This kind of a signal is, however, not always seen or even capable of being seen and where the vehicle is closed, cannot even be made and in many cases, because of the necessity for frequent repetition of signals of this kind, is wearisome. Such a signal, furthermore, is not readily observed at night, particularly when the illumination is poor and is, at best, a most unsatisfactory device.

For the above reasons, therefore, numerous plans have been proposed for showing a signal, most of these comprising devices located upon the front of the machine in proximity to the driver. The particular object of my invention is to provide a signal mounted preferably upon the rear of a vehicle and adapted to be displayed positively, plainly and quickly whenever a change of the direction of travel of the vehicle is contemplated. A further object of my invention is to provide a novel and simple mechanism whereby the direction-indicating member may be actuated to two independent operative positions to indicate respectively the right and left directions of turn. Other more specific objects of my invention will appear from the description hereinafter and the features of novelty will be pointed out in the appended claims.

Reference is to be had to the accompanying drawings which, for the purposes of illustration and description, show an example of my invention without defining its limits, and in which Figure 1 is a more or less diagrammatic view illustrating a typical installation of my invention in an automobile of any usual construction, non-essential parts of the car being shown in dotted lines or being entirely omitted; Fig. 2 is an enlarged view of the signal in its inoperative position; Fig. 3 is a similar view illustrating the direction signal and a stop signal with which it may be combined in operative positions and illustrating another operative position of the direction signal in dotted lines; Fig. 4 is a side view partly in section; Fig. 5 is a detail view illustrating the tube and pipe connections of the signal; Fig. 6 is a detail plan view of a distributing device which forms part of my invention; Fig. 7 is a front elevation thereof; Fig. 8 is a sectional view on the line 8—8 of Fig. 6 and Fig. 9 is a diagrammatic view illustrating the arrangement of piping which may be utilized in installing my improvement.

As shown in the drawings, the signal comprises a casing 10 of any suitable construction and shape and adapted to be mounted upon a convenient part of the automobile or other vehicle, preferably at the rear thereof, for instance by means of a bracket 11, a holder 12 for a license tag or plate being included in the arrangement if desired. The signal comprises further an indicating member 13 which, in the illustrated example, is shown in the form of an arrow and is pivotally mounted by means of a shaft 14 upon the casing 10. The indicating member, or more specifically, the arrow 13 is intended to be thrown from the inoperative position shown in Fig. 2 to one or the other of two horizontal positions pointing either to the right or to the left, as shown in full lines and dotted lines respectively in Fig. 3. The mechanism whereby the described actuation of the indicating member 13 is brought about is shown in the illustrated example in the form of a piston 15 mounted to reciprocate in a cylinder 16 and pivotally connected at 17 with a link 18; the latter in turn is pivotally connected at 17$^a$ with a bracket 19$^a$ carried by a gear 19 rotatably mounted upon a fixed shaft 20 in the casing 10. The gear 19 meshes with a pinion 21 secured upon the shaft 14 by which the indicating member 13 is carried, the arrangement described providing a simple means whereby the required throw of the indicating member 13 is secured, as will appear from the description hereinafter. A coil spring 22 surrounds the shaft 20 and has its one end secured thereto and its other end fastened to the gear 19, and exerts a tension which actuates the gearing 19 and 21 in a direction tending to throw the indicating member 13 back into its inoperative position. The cylinder 16 is provided with ports 23 and 24 located respectively in the side wall and in the bottom of the cylinder and connected by means of tubes 25 and 26 with outlets 27 and 28 respectively, as shown in Fig. 2. The outlets 27 and 28 are in turn connected by means of pipes 30 and 31 with passages 32 and 33 formed in the distributing valve-block 34 and provided with communicating channels 35 and 36 respectively which terminate at the face 37 of the block 34. The block 34 is further provided with a passage 38 and a communicating channel 39 which also terminates at the face 37 of said block and is connected by means of a pipe 40 with the intake manifold 41 of the engine or with some other device capable of producing suction. A valve member 42 is mounted in surface engagement with the face 37 of the block 34 and is rotatably carried upon a spindle 43 fixed in a valve casing 44, a spring 45 serving to maintain said valve member 42 in airtight engagement with the surface 37. The valve member 42 is constructed with a recess 46 which is in permanent communication with the channel 39 and consequently through the medium of the passage 38 and pipe 40 with the intake manifold 41 or other equivalent suction-producing means. The recess is so proportioned and located with respect to the channels 35 and 36 as to be capable of being moved into registry therewith, whereby one or the other of said channels 35 and 36 may be selectively brought into communication with the intake manifold or other suction-producing means 41, as will be more fully described hereinafter. Any suitable means may be provided for operating the valve member 42; for instance, a pin or other projection 47 may project from the member 42, as shown in Fig. 8, into an annular groove 48 formed in an actuating member 49 which, in addition, is provided upon opposite sides of said groove 48 with annular recesses 50 and 51 respectively. The actuating member 49 is slidably mounted in the casing 44 by means of stems 52 and 53 which project in opposite directions from the member 49 through and beyond bearings 54 constituting parts of the casing 44. The projecting ends of the stems 52 and 53 are preferably provided with knobs 55 and 55ª respectively whereby the operation of the device, as will appear more fully hereinafter, is facilitated. Coil springs 56 and 57 surround the stems 52 and 53 respectively and exert an equal tension tending to maintain the member 49 in a central, inoperative position in which the valve member 42 is located so that a relief aperture 58 formed therein is in registry with the channel 36. A leaf-spring 59 is mounted in the casing 44 and is provided at its free end with a nose 60 adapted by coöperation with the annular channel 48 to maintain the parts in the neutral position and by snapping into the annular recesses 50 and 51, in the operation of the device, to maintain the parts thereof in an adjusted position as will be described more fully hereinafter. The distributing valve being described comprises further a plunger 61 having a head 62 at its one end and provided at its other end with a knob 63 or the like, said plunger 61 being slidably mounted in the casing 44 and carrying a projection which, as shown, may be in the form of a sleeve 64 adjustably mounted upon said plunger and having an annular flange 65 arranged to engage the spring 59. With this arrangement, a movement of the plunger 61 to the left in Fig. 7 will, as hereinafter brought out, cause the nose 60 of the spring 59 to be moved out of the annular recesses 50 or 51 as the case may be, to permit the parts to resume a normal position when manual resetting of the device is required for any reason; the plunger 61 is operated to automatically restore the parts to normal position by means of a cam member 66 which, in the preferred arrangement, is fixed upon the hub 67 which customarily forms part of the steering wheel 68 and serves to connect the latter with the usual steering post 69. In this case, the distributing valve is mounted upon the tubular standard 70 in which the steering post 69 rotates, any suitable securing means being utilized for the purpose; for instance, as shown in the illustrated example, a band 71 having its one end fixed to the distributing valve and its other end fastened thereto by means of a screw 72, may constitute the securing means. The plunger 61 may be adjusted lengthwise in the sleeve 64 to bring the head 62 into the proper position to provide the necessary movement for forcing the spring nose 60 from the annular grooves 50 and 51 to allow the actuating member 49 to return to neutral position upon engagement of the head 62 by the cam 66.

In the normal condition of the parts, the indicating member 13 occupies the position shown in dotted lines in Fig. 2 and the valve member 42 is in the position shown in Fig. 7 in which the recess 46, while it remains in registry with the channel 39, occupies a neutral, intermediate position in which it is out of registry and therefore does not communicate with either of the channels 35 and 36; the channel 36 is, however, in communication with the relief aperture 58 of said valve member 42 so that the interior of the cylinder 16 is in communication with the atmosphere. Assuming now that the engine is in operation with the vehicle in motion, and it is desired to change the course or travel of the latter to the left, in such case, the driver exerts a pressure upon the left-hand knob 55 whereby the stem 52 is moved inwardly with respect to the casing 44 and correspondingly shifts the actuating member 49 and the stem 53 with its knob 55ª, the spring 57 being placed under compression by this operation and the stem 53 moving out of the casing 44 to the same extent that the stem 52 moves into the same. The described movement of the parts continues until the nose 60 of the cam 59 snaps into the annular recess 50 and thereby temporarily locks the elements in their adjusted positions. By this operation and through the medium of the pin 47, the valve member 42 is rotated upon the spindle 43 to a position in which the recess 46 registers with the channel 35 and thereby brings the passage 32 and pipe 30 into communication with the channel 39, passage 38 and pipe 40 and thus connects the cylinder 16 with the intake manifold or other suction-producing means 41 through the medium of the tube 25. Suction is thereby produced in said cylinder 16 through the port 23 and serves to draw the piston 15 into said cylinder until the inner end of said piston reaches the port 23, but does not pass beyond the same. This movement of the piston is communicated to the link 18 and gearing 19 and 21 and by rotating the shaft 14, swings the indicating member 13 to a horizontal position in which the indicating member or arrow points toward the left in Fig. 2 and thus indicates to the drivers of other vehicles that it is intended to turn in the indicated direction or, in other words, to the left. As the indicated turn is being made and the steering wheel 68 is manipulated to cause the vehicle to make this turn, the cam member 66 will engage the head 62 and exert a pressure thereon whereby the plunger 61 and annular flange 65 are moved to the left in Fig. 7 and the nose 60 of the spring 59 is shifted out of the annular recess 50. As soon as this happens, the tension of the spring 57 will be exerted to move the actuating member 49 in the reverse direction and thereby cause the valve member 42 to be correspondingly rotated, thus moving the recess 46 out of registry with the channel 35 back to a neutral position and bringing the release port 58 into registry with said channel 36. As soon as this happens, the vacuum in the cylinder 16 resulting from the suction produced therein will be destroyed by reason of the fact that air will enter through the port 58, channel 36, passage 33, pipe 31 and tube 26. The piston 15 being now freed from restraint, the indicating member or arrow 13 will be returned to its normal position under the influence of the spring 22 exerted upon the gear 19 and transmitted by way of the pinion 21 to the shaft 14, whereby said arrow 13 is carried. It will be noted that in the operation of the device as so far described, the movement of the indicating member 13 from its inoperative position to its operative position represents approximately an arc of 90°.

If it is now desired to indicate a change of travel toward the right, the right-hand knob 55ª is pressed toward the casing 44 and thereby moves the actuating member 49 to the left in Fig. 6 until the nose 60 of the spring 59 snaps into the recess 51 and causes the valve member 42 to be rotated in the same direction and brings the recess 46 into registry with the channel 36; this establishes communication between said channel 36 and the channel 39 and connects the passage 38, pipe 40 and intake manifold or other suction-producing means 41 with the pipe 31 and with the cylinder port 24 through the medium of the tube 26. Suction is now again produced in the cylinder 16 whereby the piston 15 is again drawn inwardly but this time, because of the location of the port 24 in the bottom of said cylinder, a materially greater distance into the same than in the previously described operation. This greater inward movement of the piston 15 is communicated by way of the link 18 and gearing 19 and 21 to the indicating member or arrow 13 and results in throwing the latter from the position indicated in Fig. 2 to the horizontal position indicated by solid lines in Fig. 3 and pointing toward the right. In other words, in completing this movement, the arrow 13 describes an arc of approximately 270° or, in other words, may be said to be thrown three quarters of the way around. As the steering wheel is again actuated to turn the vehicle, the plunger 61 will be again pressed inwardly through the medium of the head 62 and will thereby release the nose 60 of the cam 59 from the annular recess 51 and thus permit the spring 56 to restore the parts to neutral position in which the recess 46 again occupies an intermediate location between the channels 35 and 36 and the latter channel is in communication with the relief aperture 58. The vacuum resulting in the cylinder 16 from the suction produced therein being in this way destroyed as hereinbefore described, the indicating arrow 13 will be swung back to normal position through the medium of the spring 22, gear 20 and pinion 19.

If the driver of the vehicle, after actuating the signal in one or the other of the indicated ways, changes his mind or finds that he has made a mistake in the direction intended to be indicated, he may simply exert a pull upon the knob 63, thus disengaging the nose 60 of the spring 59 from either of the annular recesses 50 or 51, and permitting one or the other of the springs 56 or 57 to restore the parts to normal position to permit a correct resetting thereof.

In the preferred construction and arrangement, the direction-indicating signal so far described may be combined with a stop signal whereby notice is given that the vehicle in which the signal is installed is about to stop. In such case, the casing 10 is preferably provided with a glass front 73 and with an interior illuminating device of any suitable character which has been omitted for the sake of clearness; the word "stop" may be produced in any convenient manner upon the glass front 73 so as to contrast therewith. An obscuring disk 74 is pivoted at 75 upon the casing 10 and may be actuated by means of a piston 76 connected through the medium of a link 77 with a crank 78 fixed upon the pivot shaft 75. A spring 79 serves to return the obscuring disk 74 to its normal position. The piston 76 reciprocates in a cylinder 80 which is provided with a port 81; the latter is connected through the medium of a tube 82 and port 83 with a pipe 84 which in turn communicates with a valve casing 85 which may be constructed as shown in Fig. 9 and which is connected by means of a pipe 86 with the intake manifold or other suction-producing means 41 by way of the pipe 40. The valve 85ª which is mounted in the valve casing 85 is connected with a bracket 87, for instance by means of a spring 88, the bracket 87 being fixed upon the brake-rod 89 so as to partake of the movements thereof and thus actuate the valve 85ª in coincidence with the operation of the customary brake-pedal. With this arrangement, each time the brake-pedal is operated to retard or stop the vehicle, the valve 85ª is adjusted to bring the cylinder 80 into communication with the intake manifold or other suction-producing means 41. Suction is in this way produced in said cylinder 80 and by drawing the piston 76 into the same, swings the obscuring disk 74 from a position in which the signal "stop" is covered to a position in which this signal is exposed. When the brake is released, the parts are restored to normal position by means of the spring 79 and because air is permitted to enter through a port 90 in the valve casing 85.

The direction-indicating signal is simple in construction and efficient in operation and provides a reliable medium whereby an intended change in the direction of travel is positively indicated to other drivers so that accidents and injuries to the occupants of any particular vehicle or vehicles are avoided. When combined with the stop signal for instance, as herein described, the arrangement provides a device which completely overcomes the possibility of interference between vehicles and which adequately meets the requirements of the laws of many communities. It will be understood that while it may be desirable to combine my improved direction-indicating signal with a suitable type of stop signal, the same is capable of efficient use independent of any other signaling device and when so used is of maximum utility in indicating the intentions of the driver of the vehicle as to changes in direction of travel. While I have shown my invention and described it with respect to a signal intended to indicate right and left changes of travel direction, it will be understood that the signal may be equally well adapted to indicate changes in forward and rearward traveling and also to indicate stoppage and starting of the vehicle in which the signal is installed.

Various changes in the form shown and described may be made within the scope of the claims without departing from the spirit of my invention.

I claim:

1. A signaling device comprising a support, a direction-indicating member pivoted thereon, a cylinder, a piston movable therein and connected with said member, a plurality of suction connections communicating with said cylinder whereby suction is produced in said cylinder to draw said piston to two different positions therein and thereby adjust said member to two operative positions distinct from one another and indicating right and left changes of travel respectively and valve mechanism for selectively controlling said connections.

2. A signaling device for vehicles comprising a pivoted member for indicating right and left changes of travel, suction-operated means for actuating said member, a suction-controlling valve whereby said suction-operated means is selectively caused to adjust said member to two operative positions distinct from one another and indicating right and left changes of travel respectively, and means for actuating said valve to relieve the suction and restore the member to normal, inoperative position from either of its operative positions.

3. A signal comprising a casing, a direction-indicating member pivoted thereon, a cylinder in said casing, a piston movable in said cylinder and connected with said member, a pair of suction connections communicating with said cylinder through the side wall and bottom respectively, a valve block provided with a main passage arranged for permanent connection with a suction-producing means, and with auxiliary passages adapted to be permanently connected with said suction connections, a valve casing upon said block, a valve in said valve casing for selectively connecting said auxiliary passages with said main passage whereby said piston is adapted to be moved into said cylinder to a greater or less extent to pivotally throw said member through arcs of greater and less degrees into two operative positions distinct from one another and indicating right and left changes of travel respectively, valve-actuating means slidable in said valve casing in opposite directions for manually operating said valve, a spring coöperating with said valve-actuating means to maintain said valve in an adjusted position and a plunger whereby said spring is adjusted to release said valve-actuating means and restore said valve to a neutral position and relieve the suction in said cylinder, whereby said member is restored to its normal inoperative position from either of its operative positions.

4. In a self-propelled vehicle including steering mechanism, the combination of a direction-indicating member, suction-operated means for actuating said member, valve mechanism whereby said suction-operated means is selectively caused to adjust said member to two operative positions distinct from one another and indicating opposite directions, and means operated coincidentally with the steering mechanism for actuating said valve mechanism to relieve the suction and restore the member to normal position from either of its operative positions.

5. In a self-propelled vehicle including steering means, the combination of a casing, a direction-indicating member pivoted thereon, a cylinder in said casing, a piston movable in said cylinder and connected with said member, a plurality of suction connections communicating with said cylinder through the side wall and bottom respectively, a valve for selectively controlling said connections whereby said piston is moved into said cylinder to a greater or less extent to adjust said member to two operative positions distinct from one another and indicating right and left changes of travel respectively, and a device operatively connected with the steering mechanism to move therewith and actuate said valve to relieve the suction in said cylinder and thereby restore the member to normal position from either of its operative positions.

6. In a self-propelled vehicle including steering means, the combination of a casing, a direction-indicating member pivoted thereon, a cylinder in said casing, a piston movable in said cylinder and connected with said member, a plurality of suction connections communicating with said cylinder through the side wall and bottom respectively, a valve block mounted upon the steering means and provided with a main passage in permanent connection with a suction-producing means and with auxiliary passages communicating permanently with said suction connections, a valve for selectively connecting said auxiliary passages with said main passage whereby said piston is moved into said cylinder to a greater or less extent to adjust said member to two operative positions distinct from one another and indicating right and left changes of travel respectively, manually-actuated means for operating said valve, a manually-operated plunger whereby said valve is adjusted to relieve the suction and restore said member to normal position from either of its operative positions and a cam member operatively connected with said steering mechanism for automatically actuating said plunger in coincidence therewith to automatically accomplish the same result.

7. The combination of a self-propelled vehicle including steering means, a direction-indicating member for indicating right and left changes in the direction of travel, means for selectively controlling said member to adjust it to two operative positions distinct from one another, and means operating in coincidence with said steering means for automatically restoring said member to normal position from either of its operative positions.

In testimony whereof I have hereunto set my hand.

J. HOWARD VAN SCIVER.